United States Patent [19]

Schell et al.

[11] Patent Number: 4,718,054
[45] Date of Patent: Jan. 5, 1988

[54] SERVO ERROR WRITE BLANKING CIRCUIT FOR AN OPTICAL RECORDING DISK

[75] Inventors: David L. Schell; Henk A. Van der Put, both of Colorado Springs, Colo.; Johannes J. Verboom, Bergeijk, Netherlands

[73] Assignee: Laser Magnetic Storage International Company, Colorado Springs, Colo.

[21] Appl. No.: 869,012

[22] Filed: May 28, 1986

[51] Int. Cl.$^4$ .......................... G11B 3/82; G11B 21/10
[52] U.S. Cl. .......................... 369/54; 369/45; 369/46; 369/100; 369/116
[58] Field of Search .................. 369/44–46, 369/54, 100, 109, 106, 111, 116; 250/201 DF

[56] References Cited

U.S. PATENT DOCUMENTS

| | | | |
|---|---|---|---|
| 3,654,624 | 4/1972 | Backer et al. | 340/173 |
| 4,001,494 | 1/1977 | Adler et al. | 358/127 |
| 4,051,329 | 9/1977 | Blondet et al. | 179/100.3 N |
| 4,093,961 | 6/1978 | Kanamaru | 358/128 |
| 4,152,002 | 4/1985 | Kosaka et al. | 369/44 |
| 4,162,398 | 7/1979 | Kayanuma | 250/205 |
| 4,243,848 | 1/1981 | Utsumi et al. | 369/45 |
| 4,243,849 | 1/1981 | Goshima et al. | 369/62 |
| 4,283,785 | 8/1981 | Miyauchi et al. | 369/116 |
| 4,488,277 | 12/1984 | McFarlane et al. | 369/48 |
| 4,507,767 | 3/1985 | Takasugi et al. | 369/54 |
| 4,509,156 | 4/1985 | Ohara et al. | 365/54 |
| 4,617,654 | 10/1986 | Gross et al. | 369/46 |
| 4,651,314 | 3/1987 | Yoshikawa et al. | 350/201 DF |

*Primary Examiner*—Aristotelis M. Psitos
*Attorney, Agent, or Firm*—Sheridan, Ross & McIntosh

[57] ABSTRACT

A blanking circuit used with an optical recording disk system for eliminating the effect of far field shift during high laser power writing on a disk. The circuit provides a differential output one-shot that is fired for a time long enough for write pulse transients to be gone from photo diodes in a light detector before the circuit switches are returned to a read mode.

7 Claims, 7 Drawing Figures

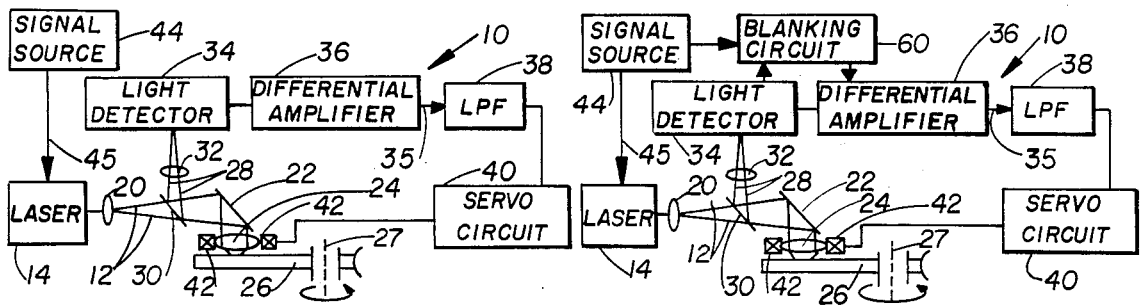
FIG-1 PRIOR ART
FIG-7
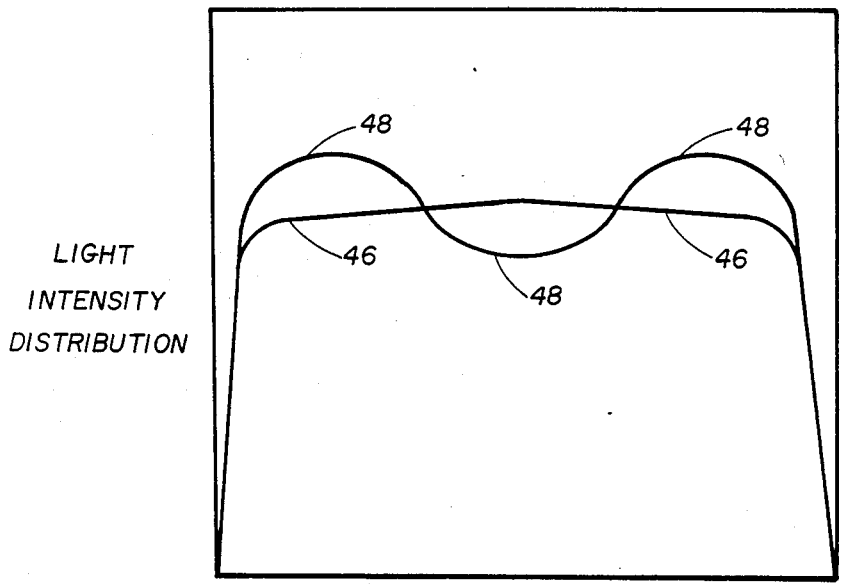
LIGHT INTENSITY DISTRIBUTION
BEAM CROSS SECTION
FIG-2
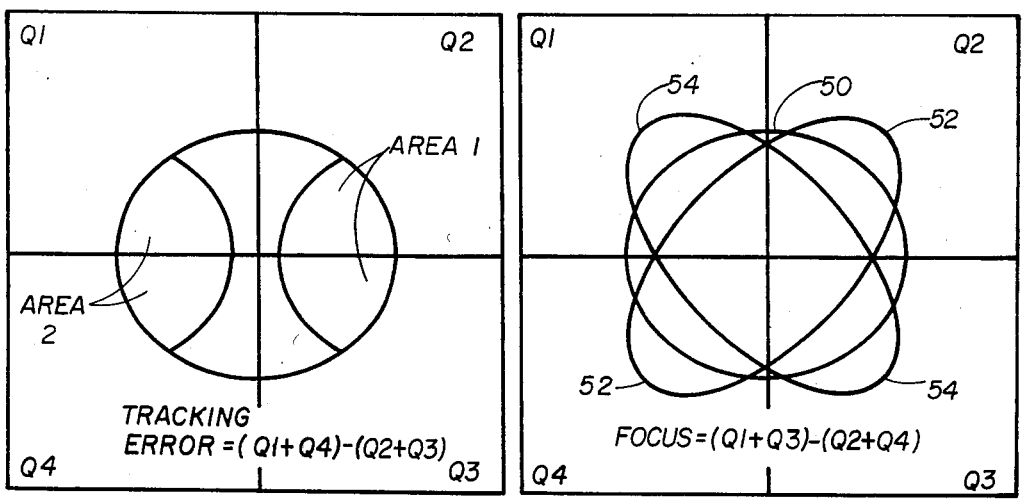
TRACKING ERROR = (Q1+Q4)−(Q2+Q3)
FOCUS = (Q1+Q3)−(Q2+Q4)
FIG-4
FIG-3

SERVO ERROR WRITE BLANKING CIRCUIT FOR AN OPTICAL RECORDING DISK

BACKGROUND OF THE INVENTION

This invention relates to a circuit design used in conjunction with an optical recording disk and more particularly, but not by way of limitation, to a servo error write blanking circuit used with an optical recording disk to eliminate the effect of far field shift.

In the following U.S. Pat. Nos. 4,512,002; 4,509,156; 4,507,767; 4,488,277; 4,283,785; 4,243,849; 4,243,848; 4,162,398; 4,093,,961; 4,051,329; 4,001,494; and 3,654,624 various types of control systems for focusing on an optical disk and optical video playback systems are described. None of these above-mentioned patents provide the unique features and advantages of the subject blanking circuit as described herein.

SUMMARY OF THE INVENTION

The subject blanking circuit provides for the elimination of the effect of far field shift during high laser power writing on an optical recording disk.

The objective of the blanking circuit is accomplished through the use of a one-shot driving a differential current switch. The one-shot is fired for a time long enough for the write pulse transients to be gone from sense and quad photo diodes before returning the current switches to a read mode.

The blanking circuit includes a one-shot used in conjunction with differential switch transistors. The switch transistors are connected to four common base isolation transistors and four differential switches.

The differential switches divert the quad diode currents to ground during the write pulse. The one-shot drives the differential switches for a time greater than the write pulse time so all of the switching transients on the quad will be gone before switching back to the read mode.

The advantages and objects of the invention will become evident from the following detailed description of the drawings when read in connection with the accompanying drawings which illustrate preferred embodiments of the invention.

BRIEF DESCRIPTION OF THE DRAWINGS

FIG. 1 illustrates a prior art laser disk drive servo loop.

FIG. 2 illustrates a beam cross-section and light intensity as a high laser source is switched from a write to read power mode.

FIG. 3 illustrates a quad detector when the pattern is in focus and out of focus from either being too far or too close to an optical disk.

FIG. 4 illustrates a quad detector when the laser is on track and off track toward the spindle drive or away from the spindle drive.

FIG. 7 illustrates a laser disk drive servo loop with the blanking circuit incorporated therein.

DESCRIPTION OF THE DRAWINGS

Figures 5, 6:
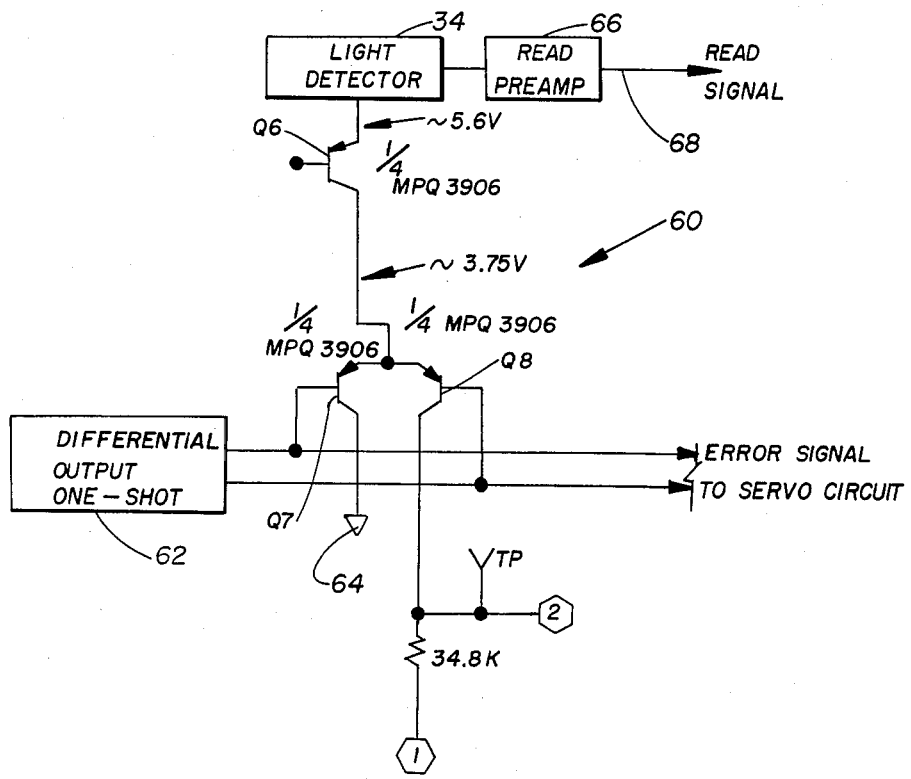
FIG. 5 illustrates the one-shot and one-fourth of the subject blanking circuit.
FIG. 6 illustrates a complete blanking circuit as used in conjunction with the optical recording disk.

In FIG. 1 a typical prior art optical recording device 10 is shown having a laser beam 12 emitted from a laser source 14 passing through a lens 20 and onto a mirror 22 where the beam is focused by a focusing lens 24 on a rotating recording disk 26 driven by a spindle drive shown as line 27. A reflective beam 28 is received on a half-mirror 30 and onto a lens 32 where it enters a light detector 34. The light detector 34 is made up of four photo diodes (Quad Detector) Q1, Q2, Q3 and Q4 as shown in FIGS. 3 and 4. While the detector 34 is discussed having four photo diodes it should be kept in mind the detector may have any number of photo diodes. After detection by the light detector 34, a differential amplifier 36, produces in an amplified form, a difference between the sum of the outputs from the detecting regions Q1+Q3 and the sum of the outputs from the detecting regions Q2+Q4 for determining focus error. For detecting tracking error, the regions (Q1+Q4)−(Q2+Q3) are input to the differential amplifier 36.

An output signal 35 from the amplifier 36 is applied to a low pass filter 38 where the focus and tracking error signal components are extracted. The signal 35 is applied to a servo circuit 40 which in turn drives moving coils 42 to automatically provide focus and tracking correction. A signal source 44 generates a signal 45 to be recorded. Upon receipt of the signal 45 from the source 44 the laser 14 modulates the laser beam 12.

In FIG. 2, the effect of far field shift is illustrated which is typical in semi-conductor lasers as the power out of a laser is changed. As the laser power is varied from a low read power indicated by line 46 to a high write power indicated by line 48, the laser beam front intensity distribution changes as shown.

The above change in light intensity distribution as shown in FIG. 2 makes the focal point of the beam 12 as shown in FIG. 1 appear to shift because of the way the focus error signal is derived using Q1, Q2, Q3 and Q4 in FIG. 3. The circle 50 in FIG. 3 is on center and shows the light pattern in focus. Light pattern 52 is out of focus and the lens 24 is too far from the disk 26. Light pattern 54 is out of focus and the lens 24 is too close to the disk 26. As the light intensity changes, the light distribution on the quad detectors changes making the beam appear to move out of focus, while in reality the beam has not moved.

Also, the light intensity change in FIG. 2 has a similar effect on the tracking error signal because of the way this signal is derived using Q1, Q2, Q3 and Q4 as shown in FIG. 4. When the light in area 1 equals the light in area 2, the beam 12 is on track. When the light in area 1 is less than the light in area 2. The beam is off track toward the spindle drive 27. When the light in area 1 is greater than area 2, the beam 12 is off track and away from the spindle track 27. As the light intensity changes, the light distribution on the quad detectors changes making the beam appear to be off track while again the beam has not moved.

The above error signals, shown in FIGS. 3 and 4, change during writing causing the servo loop to drive the beam 12 out of focus and off track during writing. As the servo loop takes the beam 12 out of focus, the write power becomes insufficient to write and the writing stops. To counter this effect known as far field shift the subject blanking circuit 60 as described in FIGS. 5 and 6 has been developed. The blanking circuit 60 fits into the disk servo system as illustrated in FIG. 7. The blanking circuit 60 takes the quad currents that are developed during the write pulse and shunts the signals to ground so that the signals never get into the servo loop to cause errors.

In FIG. 5, one-fourth of the blanking circuit 60 is shown. In this diagram a differential output one-shot 62 is fired for a time long enough for the write pulse transients to be gone from the photo diodes of light detector 34 before returning current switches Q7 and Q8 which are incorporated into four quad switching transistor packs U7 and U8 shown in FIG. 6 to a read mode. U6 is also a quad switching transistor pack as shown in FIG. 6. The switches Q7 and Q8 divert the quad diode currents from the light detector 34 to a ground 64 during the write pulses. The one-shot 62 that drives these switches is fired for 120 nS on the leading edge of each 60 nS write pulse so all the switching transients on the quads will be gone before switching back to the read mode. It should be noted in FIG. 6 the light detector 34 is connected to a read preamplifier 66 for creating the read signal indicated by a line 68.

The reason for isolating all the photo diodes Q1, Q2, Q3 and Q4 and their inputs with the common base stages Q6 is to keep the voltage changes on the diodes to a minimum. This is because of the high capacitance around the diodes, the high impedance of the diodes, the low currents flowing through the diodes and the desire for high frequency signals out of the diodes. Also, without the isolation transitors, U6, the switching transients of the blanking circuit 60 could be seen in the read preamp 66.

Changes may be made in the construction and arrangement of the parts or elements of the embodiments as described herein without departing from the spirit or scope of the invention defined in the following claims.

What is claimed is:

1. A blanking circuit used with an optical recording disk system having a read and write mode and means to generate read and write pulses and connected between the systems light detector with photo diodes and a differential amplifier, the blanking circuit also connected to the systems signal source, the circuit comprising:
    a first switching transistor connected to the light detector;
    a second switching transistor connected to the light detector and the first switching transistor; and
    a differential output one-shot connected to the first and second switching transitor, the one-shot diverting currents from the photodiodes to a ground connected to the transistors during write pulses.

2. The blanking circuit as described in claim 1 further including a common base isolation transistor connected to and disposed between the light detector and the first and second switching transistors.

3. The blanking circuit as described in claim 2 wherein the first and second switching transistor and isolation transistor are part of individual quad transistor packs.

4. A blanking circuit used with an optical recording disk system having a read and write mode and means to generate read and write pulses and connected between the systems light detector with photo diodes and a differential amplifier, the blanking circuit also connected to the systems signal source, the circuit comprising:
    a first switching transistor;
    a second switching transistor connected to the first transistor;
    a common base isolation transistor connected to the first and second transistors and the light detector; and
    a differential output one-shot connected to the first and second transistors, the one shot diverting currents from the photo diodes to a ground connected to the first transistor.

5. The blanking circuit as described in claim 4 wherein the one-shot is fired for a time period in the range of 100 nS for grounding the current during the write pulses so that all of the switching transients on the photo diodes will be gone before switching back to a read mode.

6. The blanking circuit as described in claim 4 wherein the transistors are part of individual quad transistor packs.

7. The blanking circuit as described in claim 4 wherein the one-shot is fired for a time period longer than the duration of the write pulses to divert the photocurrents to ground.

* * * * *